Patented Feb. 23, 1926.

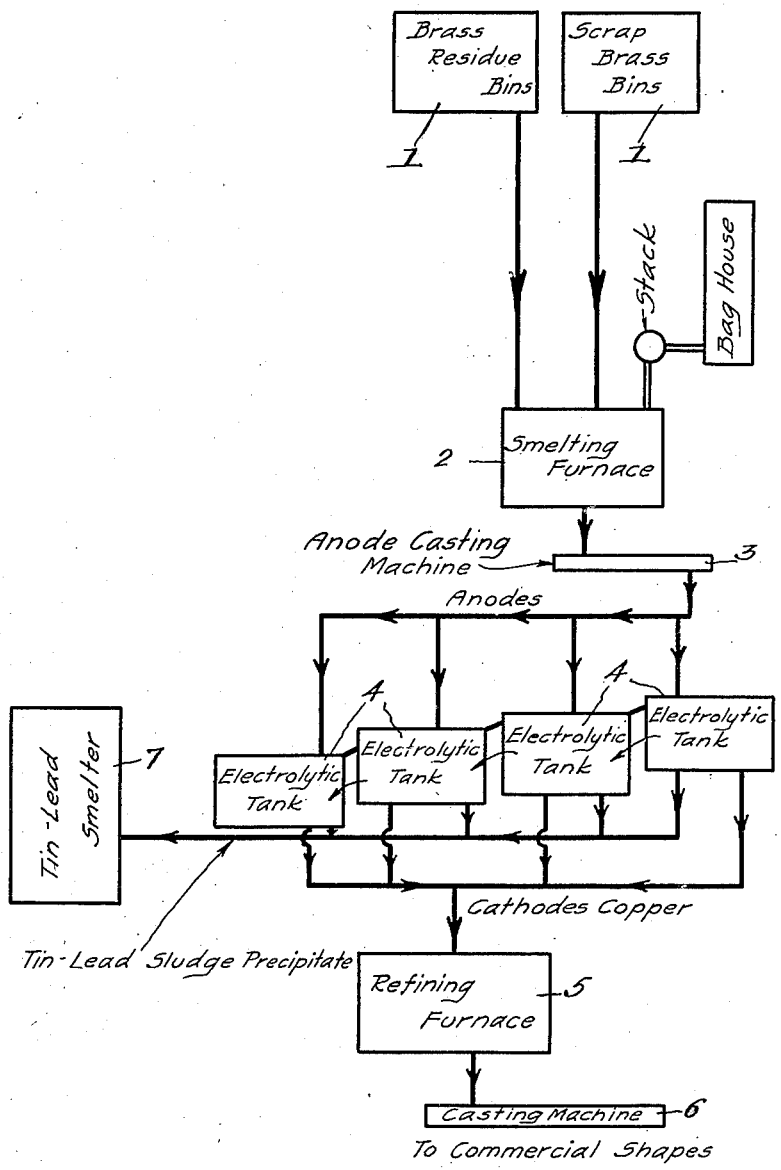

1,574,043

UNITED STATES PATENT OFFICE.

TANNIE LEWIN, OF ST. LOUIS, MISSOURI, ASSIGNOR OF ONE-HALF TO WILLIAM LEWIN, OF ST. LOUIS, MISSOURI.

PROCESS FOR THE SEPARATION AND RECOVERY OF THE COPPER, TIN, AND LEAD CONTENT OF BRASS OR BRONZE SECONDARY METALS AND THEIR RESIDUES.

Application filed August 24, 1925. Serial No. 52,220.

*To all whom it may concern:*

Be it known that I, TANNIE LEWIN, a citizen of the United States, residing at the city of St. Louis, State of Missouri, have invented a certain new and useful Process for the Separation and Recovery of the Copper, Tin, and Lead Content of Brass or Bronze Secondary Metals and Their Residues, of which the following is a specification, reference being had to the accompanying drawing, forming part thereof.

This invention relates generally to the refining of secondary metals and their residues.

Brass or bronze secondary metals and their residues usually contain as ingredients or components copper, tin, lead, and zinc of varying values and in varying quantities and amounts, and my present invention relates particularly to a certain new and useful method or process for the separation and recovery from such secondary metals and their residues of their copper, tin and lead content.

The present-day methods of treating or refining brass or bronze secondary metals and their residues are directed specifically to, and result in, the recovery for the most part of the copper content only, and so far as I am aware there is no known method or process of separating and recovering as metals for commercial utilization the tin and lead values of such secondary metals and their residues.

According to existing methods, in the treatment or refining of brass or bronze secondary metals and their residues, briefly described, the material is first smelted in a blast reverberatory, or other suitable furnace for effecting removal of the non-metallic, as well as, so far as is possible, the iron and other, impurities. The smelted material, which is more or less rich not only in copper, but also in tin and lead, which if recoverable as metals are all of more or less commercial value, is now treated in a standard convertor, where, under the oxidizing and blowing principles of the convertor, the tin and lead and also the zinc content are lost and thus totally wasted. I might state that such ingredients, by a process of filtration of the escaping convertor-fumes in so-called bag-houses, may be partially recovered in the form of an oxide, which, however, cannot be profitably converted to commercial metal. From the convertor the material, so partly refined or reduced, which now mainly comprises copper and is known as blister copper, is delivered to the anode furnace and there further treated until the copper content is usually 98% or even better, the final refined material being known as anode copper. The so treated and refined material and known, as I have stated, as anode copper is now cast into anode shape or form and then electrolytically, that is to say, by process of electrolysis, further refined to substantially pure or commercial copper.

Such present-day or existing methods for the refining of brass or bronze secondary metals and their residues, as is thus evident, involve and comprise several steps, require in their practice more or less constant attention and labor, and are uneconomical and wasteful, in that, as I have mentioned, by such methods the tin and lead content is at the most recoverable with the zinc content in an oxide, very much depreciated form incapable of profitable conversion to commercial metal, the tin and lead content as commercial metallic being thus substantially wholly lost.

My present invention has hence for its object the provision of a method or process for the economical treatment of such material, that is to say, bronze or brass secondary metals and their residues, for effecting the separation and recovery for profitable commercial utilization of their tin and lead content.

According to and in practicing my new process or method as illustrated in the accompanying diagrammatic or so-called flow drawing the brass or bronze secondary metal or residue under treatment is taken from the bins 1 and first smelted in a blast, reverberatory, or other suitable furnace 2. I thereby effect the removal of the non-metallic and other impurities, as well as the iron and zinc content. The so smelted material is now, directly following and from such first smelting, delivered to a suitable casting-machine or apparatus 3 and cast into forms adaptable for use as anodes, which thus contain or embody all the original ingredients or components of the secondary metal or residue under treatment minus its iron and zinc content and non-metallic and other impurities. The forms so cast and produced are then directly treated electrolytically, that is to say, utilized as anodes in an electrolytic bath in suitable electrolytic tanks 4 where, by the process of electrolysis, employing in the carrying out of such step a standard copper refining electrolytic plant, with preferably, however, somewhat deeper tanks than the ordinary tanks to obviate any liability whatsoever of affecting proper electrolytic action, not only is the pure copper electrolytically extracted from the anodes and deposited upon the cathodes, but the tin and lead values are through dissolution or disintegration removed from or separated out of the anodes and deposited or precipitated as slime upon the bottom of the several electrolytic cells of the tanks. From the electrolytic-tanks the copper-cathodes are delivered in order to a suitable refining furnace 5 and then to a suitable casting machine or apparatus 6, where they are, respectively, refined and cast in the usual manner. The slime so precipitated in the electrolytic cells is also regularly removed and delivered to suitable smelting apparatus 7, where the slime is treated and its tin and lead values or content recovered in the form of sludge and then converted into metal through process of ordinary smelting.

By my new process, I hence eliminate entirely many steps heretofore considered absolutely essential in the treatment and refining of such secondary metals and their residues for the recovery even of their copper content. My new process may be readily and inexpensively practiced, is economical and efficient, profitably effects a saving in labor and refining costs, and results in the separation and recovery for commercial utilization not only of the copper ingredient, but also of the valuable tin and lead ingredients, heretofore lost and wasted, of brass and bronze secondary metals and their residues.

Having thus described my invention, what I claim and desire to secure by Letters Patent is:

1. The process of treating brass or bronze secondary metals or their residues for the separation and recovery of their copper content, which comprises treating the material to effect removal of both its iron content and its nonmetallic and other impurities, then casting the remaining material directly into forms adaptable for use as anodes, and then utilizing the same as anodes in an electrolytic bath, whereby the copper content is electrolytically extracted and deposited upon the cathodes.

2. The process of treating brass or bronze secondary metals or their residues for the separation and recovery of their copper content, which comprises treating the material to effect removal only of both its iron and zinc content and its nonmetallic and other impurities, then casting the remaining material directly into forms adaptable for use as anodes, and then directly utilizing the same as anodes in an electrolytic bath for electrolytically extracting the copper and depositing the same upon the cathodes.

3. The process of treating brass or bronze secondary metals or their residues for the separation and recovery of their tin and lead content, which comprises treating the material to effect removal only of both its iron and zinc content and its nonmetallic and other impurities, then casting the remaining material directly into forms adaptable for use as anodes, then utilizing the same as anodes in an electrolytic bath, their tin and lead content in such operation being separated out and precipitated as slime within the electrolytic cells, then removing the slime, and then treating the slime for the recovery of the tin and lead content thereof.

4. The process of treating brass or bronze secondary metals or their residues for the separation and recovery of their copper, tin, and lead content, which comprises treating the material to effect removal only of both its iron and zinc content and its nonmetallic and other impurities, then casting the remaining material directly into forms adaptable for use as anodes, then utilizing the same as anodes in an electrolytic bath, whereby their copper content is electrolytically extracted and deposited upon the cathodes and their tin and lead content separated out and precipitated as slime within the electrolytic cells, removing the cathodes and the slime, and then separately refining the copper cathodes and treating the slime for the recovery of its tin and lead content.

5. The process of treating brass or bronze secondary metals or their residues for the separation of their copper content, which comprises first smelting the material for effecting removal of both its iron content and its nonmetallic and other impurities, then casting the resulting smelted material into forms adaptable for use as anodes, and then utilizing the same as anodes in an electrolytic bath.

6. The process of treating brass or bronze secondary metals or their residues for the separation and recovery of their copper content, which comprises first smelting the material for effecting removal of both of its iron and zinc content and its nonmetallic and other impurities, then casting the resulting smelted material into forms adaptable for use as anodes, and then utilizing the same as anodes in an electrolytic bath.

7. The process of treating brass or bronze secondary metals or their residues for the separation and recovery of their tin and lead content, which comprises first smelting the material for effecting removal of both its nonmetallic and other impurities and its iron and zinc content, then casting the resulting smelted material into forms adaptable for use as anodes, then utilizing the same as anodes in an electrolytic bath, the tin and lead content thereof in such operation being separated out and precipitated as slime within the electrolytic cells, and then removing and treating the slime for the recovery of its tin and lead content.

8. The process of treating brass and bronze secondary metals or their residues for the separation and recovery of their copper, tin and lead content which comprises first smelting the material for effecting removal of both its nonmetallic and other impurities and its iron and zinc content, then casting the resulting smelted material into forms adaptable for use as anodes, then utilizing the same as anodes in an electrolytic bath, whereby their copper content is electrolytically extracted and deposited upon the cathodes and their tin and lead content separated out and precipitated as slime within the electrolytic cells, then removing the cathodes and the slime, and then separately refining the copper cathodes and treating the slime for the recovery of its tin and lead content.

In testimony whereof, I have signed my name to this specification.

TANNIE LEWIN.